United States Patent [19]
Luebs

[11] Patent Number: 5,164,619
[45] Date of Patent: Nov. 17, 1992

[54] LOW SKEW CLOCKING SYSTEM FOR VLSI INTEGRATED CIRCUITS

[75] Inventor: Richard J. Luebs, Fort Collins, Colo.

[73] Assignee: Hewlett-Packard Company, Palo Alto, Calif.

[21] Appl. No.: 617,104

[22] Filed: Nov. 21, 1990

[51] Int. Cl.$^5$ .......................................... H03K 19/00
[52] U.S. Cl. .................................. 307/480; 307/445; 307/468; 307/481
[58] Field of Search ............... 307/480, 445, 468, 481

[56] References Cited

U.S. PATENT DOCUMENTS

| | | | |
|---|---|---|---|
| 4,761,567 | 8/1988 | Walters, Jr. | 307/480 |
| 5,055,707 | 10/1991 | Beard | 307/480 |
| 5,057,701 | 10/1991 | Miller, Jr. | 307/480 |

OTHER PUBLICATIONS

Jonathan Lotz et al., "A CMOS RISC CPU Designed for Sustained High Performance on Large Applications", IEEE Journal of Solid-State Circuits, vol. 25, No. 5, Oct. 1990, pp. 1190-1198.

Primary Examiner—Eugene R. LaRoche
Assistant Examiner—R. Ratliff

[57] ABSTRACT

A low skew clocking system for VLSI intergrated circuits in which a reference chip, preferably a microprocessor, generates local synchronization signals for the other chips on a common PC board. This reduces the clock skew between the reference chip and all other chips by as much as 50%. Skew between chips is further reduced by using a differential MOS driver responsive to locally generated synchronization signals to generate differential synchronization outputs. Processing speed may be further improved in accordance with the invention by implementing a quadrature clocking scheme using the differential synchronization outputs from the MOS driver whereby the timing delays between the differential quadrature clocking signals are determined by the PC board delays. Also, by breaking the logic circuitry up into pipelined elements having propagation delays on average on the order of ¼ of the system clocking period and applying the quadrature clock-scheme to interspersed latches, data may theoretically propogate through the logic and never be delayed by a clock edge. The system of the invention thus allows very high clock rates to be attainable for a given technology.

21 Claims, 3 Drawing Sheets

LOW SKEW CLOCKING SYSTEM FOR VLSI INTEGRATED CIRCUITS

BACKGROUND OF THE INVENTION

1. Field of the Invention

The present invention relates to a low skew clocking system for VLSI integrated circuits, and more particularly, to a clocking network in which one chip has a local clock generator circuit which generates the synchronization signals for other chips on a common PC board.

2. Description of the Prior Art

In the modern competitive environment for data processing systems, the processing speed and hence performance doubles every year or so. Hence, engineers are constantly searching for new ways to improve the processing speeds of their systems in order to remain competitive. A typical way to improve processing speed is to increase the clocking frequencies of the systems and sub-systems Increasing the clock frequency can improve performance nearly linearly for typical data processing systems by reducing the cycle time. However, data processing systems can only function as rapidly as their hardware permits, and as a result, there are limits as to how much the clocking frequencies may be increased. In addition, as cycle time is shortened for a given hardware configuration, less skew in the clocking signals may be tolerated In other words, the time delay or offset between interacting signals synchronized to the system clock as a result of IC fabrication variances causes propagation delay variations and rise time/fall time variations which must be reduced to achieve higher performance.

Integrated circuit chips synchronized to a system clock of the data processing system generally have different propagation delays due to inherent variations in chip fabrication which may cause increased clocking signal skew during the operation of the system. As a result, the maximum clocking signal frequencies for a given data processing system are limited by the differences in chip speeds for chips driven by the clocking signal. Clocking signal skew is particularly troublesome when a very fast chip uses the same clocking signal as a very slow chip. Such skew is made worse by the typical processor clock variations of the clocking signal generator. The maximum frequency of the clocking signals is further limited in that the worst case tolerances for setup and hold times of the integrated circuits responsive to the clock signal must be respected.

In typical data processing systems, the different integrated circuits are synchronized to the system clock. Generally, the system clock is a single synchronizing signal that is driven to all chips in the data processing system simultaneously. However, such a single synchronizing signal has a large clock skew since any chip synchronized to the synchronizing signal can be the fastest or slowest chip in the system. For example, a central processing unit synchronized with a cache controller could be faster than the cache controller or vice versa. In such systems, the clock skew may be approximated by 2*(max−min), where max and min are the maximum and minimum clock generator delays on the chips. Those skilled in the art have attempted to minimize this clock skew by minimizing the difference between the maximum and the minimum clock generator delays on the chips. However, for a large data processing system in which many different chips are driven from the same synchronizing signal, such an approach is impractical. Moreover, such systems must be carefully designed to avoid race conditions which occur when the single synchronizing signal is delayed in one of its paths such that a signal driven from one chip to another in the critical path is received after its synchronization signal was received when the circuit was designed to receive that signal before the synchronization signal was received. Such an occurrence cannot be tolerated by the system, and accordingly, the cycle time of the system clocking signal is generally made great enough to prevent such race conditions from occurring. Of course, such an extension of the cycle time adversely affects processing speed and performance.

Other clocking techniques have been proposed to prevent the aforementioned race conditions without extending the clocking cycle. For example, quadrature clocking signals, which are dual edged clocking signals delayed by 90°, 180°, 270° and 360° with respect to each other, have been used. When quadrature clocking signals are used, a rising edge for synchronization purposes is received every quarter cycle. By so minimizing the non-overlap time between the clocking pulses, races are prevented. However, such clocking signals have heretofore been useful only for race management and have not provided for measurable performance enhancements, for even when quadrature clocking signals are used, the aforementioned processing speed limitations are still present.

For the above reasons, clocking circuits employed on high-performance VLSI processors and similar applications have had tightly controlled delay specifications in order to allow high-frequency synchronous communication between different integrated circuits in the system without violating setup and hold constraints. This control has been accomplished by using phase locked loop techniques to align the clock signal edges to a reference edge, or by designing an absolute delay which is small enough that the variation within the system is within acceptable limits. The former technique is very sensitive to the effects of noise and processing variations on the essentially analog control circuitry, while the latter technique is much more straightforward but produces lower performance systems. It has been recognized that by minimizing the delays in the system, as by placing components adjacent to one another so as to minimize PC board trace length, less clocking skew results. However, such systems are still subject to limiting paths in which the propagation delay is substantial. Moreover, by running the integrated circuits of such systems from a single system clock, circuit propagation delay variations and the like still adversely affect clock skew performance limits with the resulting adverse effect on system performance.

Accordingly, prior art data processing systems are subject to hardware limitations as to the maximum frequency at which the system may be driven and hence the maximum performance attainable from the system. However, substantial improvements in processing speed may still be made by taking into account these hardware limitations of the system. It is thus desirable to develop a clocking system which optimizes performance for a given hardware configuration by minimizing skew. The present invention has been designed to meet this need.

SUMMARY OF THE INVENTION

The present invention meets the aforementioned needs of the prior art by providing a low skew clocking network for a VLSI system in which a reference chip generates the synchronization signals for the other chips on a common PC board from a master system clock. As a result, the clock skew between the reference chip and all other chips may be reduced by as much as 50%. For very high performance systems, this can improve system performance significantly. Chip-to-chip skew may be reduced even more in accordance with the invention by using differential ECL-like MOS drivers with resistances matched to the characteristic impedances of key system PC board traces and a quadrature clocking scheme in which the delays between the respective clock edges are closely matched to the propagation delay times of the logic circuits to which they are applied. Clock skew for the key system limiting paths may thus be reduced in accordance with the invention. This results in more efficient use of cycle time, which makes it possible to use higher clocking frequencies for improved system performance.

In particular, the present invention relates to a low skew clocking system for synchronizing a plurality of integrated circuit chips on a common PC board. A preferred embodiment of the invention comprises a master system clock which generates a master clock signal for the integrated circuit chips and a local reference clock circuit on one of the integrated circuit chips which is responsive to the master clock signal for generating a local reference clock signal for predetermined other ones of the plurality of integrated circuit chips. The predetermined other ones of the plurality of integrated circuit chips are then driven by output driving means which outputs signals synchronized to the local reference clock signal. Preferably, the one integrated circuit chip is a microprocessor which generates the local reference clock signal.

In accordance with one aspect of the invention, the driving means comprises a differential MOS driving circuit having low resistance MOSFETs which have commonly connected sources and are responsive at respective gates thereof to the local reference clock signal. Such a differential MOS driving circuit in accordance with the invention preferably further comprises a first resistance connected between a first voltage $V_H$ and the commonly connected sources of the low resistance MOSFETs and second resistances connected between a second voltage $V_L$ and respective drains of the low resistance MOSFETs. For improved performance, the respective resistance values R1 and R2 of the first and second resistances are substantially greater than the internal ON impedances of the low resistance MOSFETs such that output voltages $V_{OUTH}$ and $V_{OUTL}$ of the differential MOS driving circuit are substantially equal to the ratio of R1 and R2 multiplied by the difference between $V_H$ and $V_L$. In a preferred embodiment, $V_{OUTH}$ is approximately equal to $(V_H-V_L)*R2/(R1+R2)+V_L$ (where $V_{OUTL}=V_L$). In addition, R2 is preferably selected to substantially match the characteristic impedance of the PC board traces connecting it to the MOSFETs. R1 may equal zero (if $V_{OUTH}$ can equal $V_H$ and $V_{OUTL}$ can equal $V_L$) such that the output voltage $V_{OUTH}$ is dependent only upon $V_H$ and $V_L$. Also, the low resistance MOSFETs are at least 100 microns wide, and preferably, approximately 500 microns wide.

In accordance with another aspect of the invention, the signals output by the driving means are used to generate differential quadrature clocking signals separated by a delay approximately equal to one-fourth of a clocking interval of the signals from the driving means, and these differential quadrature clocking signals are used as synchronizing signals for the other circuits. Preferably, the delay is chosen to substantially correspond to a propagation delay associated with the length of a PC board trace connecting the respective integrated circuit chips on the PC board, where as is well known, the unit delay of the PC board trace is a function of the characteristic impedance of the PC board trace.

In accordance with yet another aspect of the invention, at least one of the plurality of integrated circuit chips is comprised of alternating combinational logic and latch circuits responsive to the differential quadrature clocking signals. Preferably, the alternating combinational logic and latch circuits are disposed in a pipelined configuration such that each respective latch circuit of the at least one integrated chip receives a differential quadrature clocking signal separated by the aforementioned delay from the quadrature clocking signals received by adjacent latch circuits Also, in accordance with a pass-gate methodology of the invention, the average propagation time of the combinational logic circuits is approximately equal to the aforementioned delay. Delays can be longer in some stages (as much as three times the aforementioned delay) so long as this delay is compensated by shorter delays in the rest of the path.

The invention also encompasses a method of low skew clocking a plurality of integrated circuit chips on a common PC board. Such a method in accordance with the invention preferably comprises the steps of:

generating at an integrated circuit chip of the common PC board a local reference clock signal from a master system clock;

generating from the local reference clock signal differential quadrature clocking signals separated by a delay approximately equal to one-fourth of a clocking interval of the local reference clock signal, the delay substantially corresponding to a propagation delay associated with the length of a PC board trace connecting respective integrated circuit chips on the PC board; and driving predetermined ones of the plurality of integrated circuit chips with the differential quadrature clocking signals.

The method of the invention also preferably comprises the further step of adjusting the length of the PC board trace until its propagation delay is approximately equal to one-fourth of the clocking interval of the local reference clock signal. The method also preferably comprises the further steps of forming at least one of the plurality of integrated circuit chips of alternating combinational logic and latch circuits responsive to the differential quadrature clocking signals and disposing the alternating combinational logic and latch circuits in a pipelined configuration such that each respective latch circuit receives a differential quadrature clocking signal separated by the aforementioned delay from the differential quadrature clocking signals received by adjacent latch circuits. The combinational logic circuits are preferably formed so as to have average propagation times which are approximately equal to the aforementioned delay.

The invention further encompasses a method of low skew clocking a plurality of integrated circuit chips on a common PC board comprising the steps of:

forming at least one of the plurality of integrated circuit chips of alternating combinational logic and latch circuits in a pipelined configuration, the combinational logic circuits being formed so as to have average propagation delays which are approximately equal to a predetermined delay;

generating at an integrated circuit chip of the common PC board a local reference clock signal from a master system clock;

generating from the local reference clock signal differential quadrature clocking signals separated by the predetermined delay, the predetermined delay being approximately equal to one-fourth of a clocking interval of the local reference clock signal; and applying the differential quadrature clocking signals to the latch circuits of the at least one integrated circuit chip such that each respective latch circuit receives a differential quadrature clocking signal separated by the predetermined delay from the differential quadrature clocking signals received by adjacent latch circuits.

In accordance with such a method of the invention, the predetermined delay substantially corresponds to a delay associated with the length of a PC board trace connecting respective integrated circuit chips on the PC board. Also, a preferred embodiment of such a method comprises the further step of adjusting the length of the PC board trace until its propagation delay substantially equals the predetermined delay.

BRIEF DESCRIPTION OF THE DRAWINGS

The above and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Preferred embodiments of the invention will now be described with reference to FIGS. 1-4 wherein like numerals designate like elements. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Figure 1:
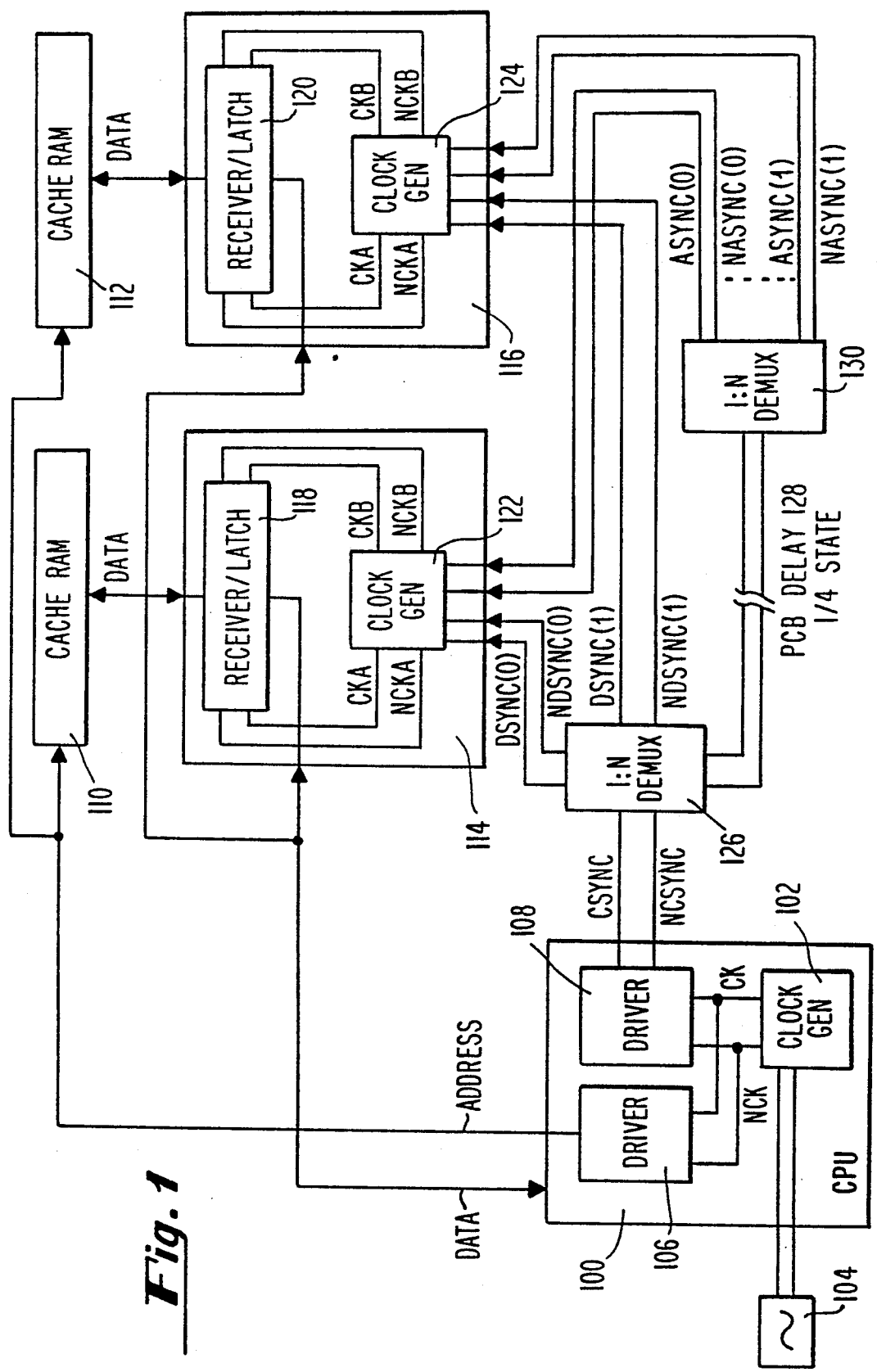
FIG. 1 illustrates a preferred embodiment of the invention in which the reference clock signal is generated by a central processing unit connected over key system limiting paths to cache controllers and data caches.
Figure 2:
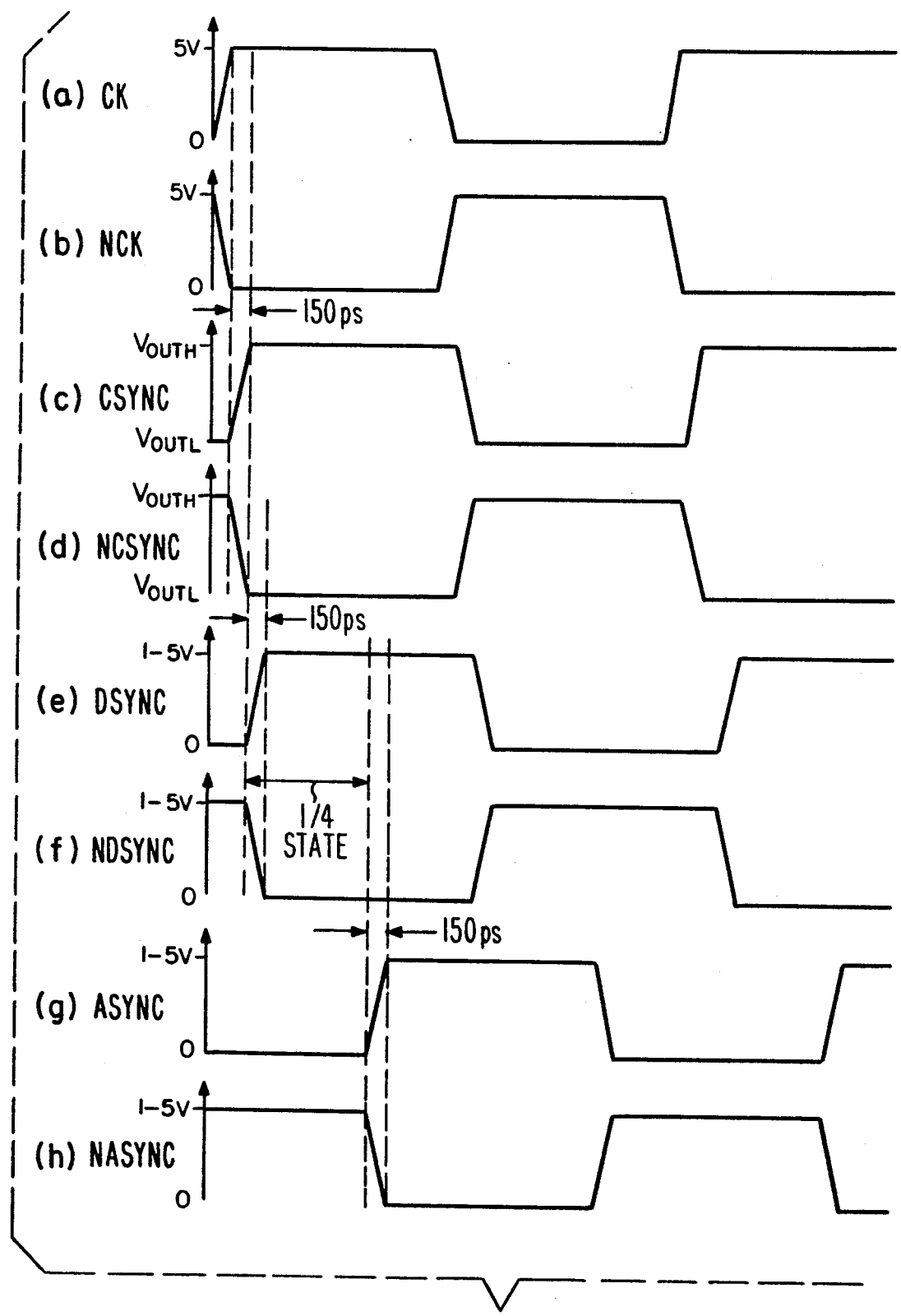
FIGS. 2(a)-(h) illustrate the differential timing signals of the system of FIG. 1.

FIG. 1 illustrates a clocking network for synchronizing a central processing unit (CPU) to its cache and cache controllers in accordance with the invention. The invention is described for use in synchronizing the cache sub-system since the illustrated data path is one of the key performance limiting paths of the processing system. Of course, the invention may also be applied to other performance limiting paths.

In the illustrated clocking network, a reference chip (in this case, central processing unit 100) has a reference clock generator 102 thereon which takes the system clocking signal from a master clock generator 104 and generates its own differential clock signals CK and NCK. These clock signals are then driven both internally and externally to other devices via clock signal drivers 106 and 108. As will be described below, the effect of this system is to eliminate the skew of the reference clock generator 102 from system clock skew calculations. In other words, since all downstream clocking signals are derived from the differential clock signals CK and NCK generated by the reference clock generator 102, the skew of the reference clock generator 102 does not affect the system clock skew for delay paths referenced to the reference clock generator 102.

In FIG. 1, the cache sub-system is synchronized to the differential clock signals CK and NCK from CPU 100. CPU 100 is chosen as the reference chip since all critical external paths to the cache sub-system involve this chip. The most critical of external paths is the path from the CPU address drivers 106 and 108 through cache RAMS 110 and 112 into cache controller chips 114 and 116. Generally, the synchronization signals used by the cache controllers 114 and 116 are generated by the CPU 100 at reference clock generator 102 and are generated very close to where the cache address lines are driven. This eliminates the skew of the reference clock generator 102 from the cache access path.

As shown, the cache controllers 114 and 116 generally comprise receiver/latching circuits 118 and 120 responsive to the data from the cache RAMS 110 and 112 for transferring this data to and from CPU 100. Control of this data transfer is maintained using timing signals CKA, NCKA, CKB AND NCKB from clock generator 122 or 124. These timing signals from clock generators 122 and 124 are preferably differential quadrature timing signals generated from the output of address driver 108 as will be described below.

During operation, the cache sub-system of FIG. 1 operates as follows. The system clock signal from master clock generator 104 is received by reference clock generator 102 and converted into differential clock signals CK and NCK. Clock signals CK and NCK are then applied to address drivers 106 and 108. Address driver 106 sends the desired address to cache RAMS 110 and 112, while address driver 108 provides synchronizing signals to the cache controllers 114 and 116 for transferring data between the cache RAMS 110 and 112 and CPU 100.

The synchronizing signals in accordance with the invention are preferably differential quadrature timing signals. Such signals are chosen to prevent race conditions and to improve system performance by theoretically allowing data to propagate through the chip logic and never be delayed by a clock edge. In particular, as shown in FIG. 1, address driver 108 generates differential synchronization signals CSYNC and NCSYNC and outputs these signals to a multiplexer 126 which generates differential synchronization signals DSYNC(0) and NDSYNC(0) for application to the cache controller 114 and DSYNC(1) and NDSYNC(1) for application to the cache controller 116. As shown in FIGS. 2(a)-(f), differential synchronization signals DSYNC(0) and DSYNC(1) and NDSYNC(0) and NDSYNC(1) substantially correspond to differential synchronization signals CSYNC and NCSYNC except for the small propagation delay on the order of 150 ps introduced by multiplexer 126. The remaining differential quadrature timing signals are created by delaying the differential synchronization signals DSYNC and NDSYNC by ¼ of a state (or 90°) in accordance with known techniques. However, this is accomplished in accordance with the present invention by adjusting the length of the PC board trace 128 disposed between multiplexer 126 and 130 so that the delay of the pC board trace 128 is approximately equal to ¼ of a state of differential synchronizing signals DSYNC and NDSYNC. For example, since one foot of PC board trace has a 2.2 nsec delay, a 50 MHZ synchronizing signal of the invention will require approximately a two foot PC board trace for PC board delay 128. By closely packing the PC board trace on the PC board, such parameters are practical for the key system paths. The delayed synchronization signals are then inputted into multiplexer 130 and outputted as delayed synchronization signals ASYNC(0) and NASYNC(0) and ASYNC(1) and NASYNC(1) for application to respective cache controllers 114 and 116 as shown in FIGS. 2(g) and (h). Differential synchronizing signals ASYNC and NASYNC are thus delayed with respect to differential synchronizing signals DSYNC and NDSYNC by ¼ of a state plus the propagation delay of multiplexer 130, which is also on the order of 150 ps.

In accordance with such a design of the invention, the system clock skew can be greatly reduced for the key system limiting paths (such as the paths between the CPU and the cache sub-system) so that higher operating frequencies may be used with the resultant increase in system performance. This is made possible in accordance with the invention by generating the system synchronization signals from the reference chip (CPU 100 in the embodiment of FIG. 1) so that the limiting paths are all referenced to this chip. By eliminating a major component of the clock skew, all paths that begin or end on this chip benefit from reduced clock skew.

Figure 3:
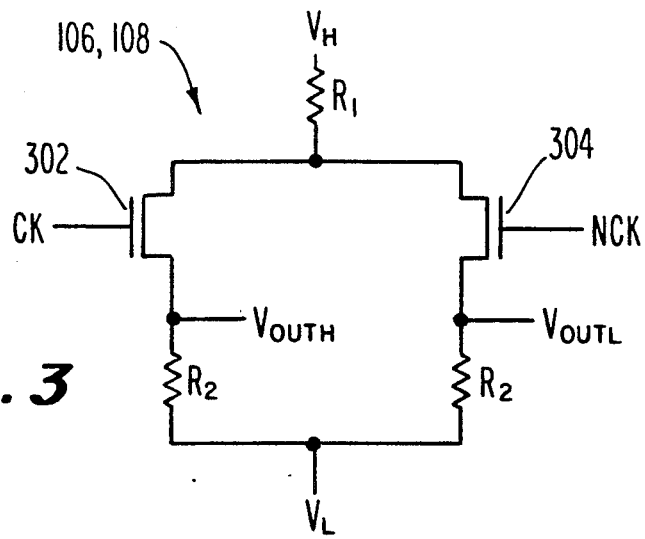
FIG. 3 illustrates a MOS driver which reduces chip-to-chip skew by matching its resistor values to the characteristic impedances of the PC board traces.

FIG. 3 illustrates an embodiment of address driver circuit 108 which may be used in accordance with the invention to further reduce chip-to-chip skew. Such a circuit may be used for address driver 106 but is not necessary since address drivers 106 and 108 need not be the same. The address driver 108 of FIG. 3 is preferably a differential ECL-like MOS driver which uses MOSFETs 302 and 304 responsive to differential signals CK and NCK which are applied to respective gates thereof. Precise output voltage levels $V_{OUTH}$ and $V_{OUTL}$ are generated by MOSFETs 302 and 304 and appropriately selected resistors R1 and R2. During operation of the MOS driver of FIG. 3, when the clock signal is low to one of the FETs, that FET is cut off and the line discharges across its source and drain through a pull-down resistor R2 to the low voltage $V_L$. However, when the clock signal is high at the input gate of one of the FETs, a high output voltage $V_{OUTH}$ is generated which is pulled high to $V_H$ by pull-up resistor R1; however, R1 is necessary only if $V_{OUTH}$ cannot equal source voltage $V_H$. Preferably, the MOS driver in accordance with the invention is designed from MOSFETs having very low ON impedance compared to the resistances of the pull-up and the pull-down resistors R1 and R2 so that the output voltage $V_{OUTH}$ may be determined from the ratio of the resistors and the voltage difference between the high voltage $V_H$ and the low voltage $V_L$. In particular, by making the ON impedance of MOSFETs 302 and 304 negligible with respect to resistances R1 and R2, a high output voltage of the MOS driver of the system may be determined in accordance with the following equation:

$$V_{OUTH} = \sim V_L + (V_H - V_L) * R_2 / (R_1 + R_2).$$

Additionally, the resistor value R2 in the MOS driver of FIG. 3 is preferably chosen to substantially match the characteristic impedance of the PC board traces connecting it to the CPU 100. By so matching the characteristic impedances of the PC board traces to the resistances of the MOS driver, clock skew and rising rate variations may be minimized and the output voltage of the MOS driver may be made independent of the manufacturing tolerances of the MOSFET's impedances since the voltage output is determined by the values of the resistors only, as evidenced by the above equation. The equation may be further simplified by removing R1 and accepting $V_{OUTH} = V_H$ and $V_{OUTL} = V_L$). The pull-up resistance R1 in such a case would be zero in the above equation.

Preferably, MOSFETs 302 and 304 of the embodiment of FIG. 3 are very wide MOSFETs which have a low ON impedance which is very low compared to the values of R1 and R2. MOSFETs 302 and 304 are preferably very wide since the resistances of the MOSFETs are inversely proportional to the width (R = 1/width). Such wide MOSFETs are preferred so that little or no impact on the output voltage is caused by the internal impedances of the MOSFETs 302 and 304. Preferably, such MOSFETs in accordance with the invention are at least 100 microns wide and one micron long. In a preferred embodiment, the MOSFETs 302 and 304 have a width of approximately 500 microns, while resistance R2 is matched to the characteristic impedance of the PC board traces connecting it to the CPU 100. R2 is preferably external to the CPU 100 (since its resistance tolerance is easier to control when it is external to the CPU 100) and is connected to the MOSFETs 302 and 304 by PC board traces to which it is matched. Sample values for R1 and R2 would be R1 = R2 = 42 ohms for a PC board trace having a characteristic impedance on the order of 42 ohms.

The ON impedance of MOSFETs has been typically difficult to control because the impedance is process dependent. This problem has been addressed in the MOS driver of FIG. 3 by dominating the impedances of the MOSFETs 302 and 304 with the pull-up and pull-down resistances R1 and R2, which are fixed. Also, by providing differential clocking signals as ECL-type synchronization signals with small voltage swings, the timing of their cross-over point may be more accurately controlled than can be attained by a single-ended synchronization signal of the type described in the background portion of the specification. In particular, with differential synchronization signals, much lower voltage levels may be used since most noise seen by these signals will be common mode and will not cause errant behavior. By contrast, a single-ended synchronization signal would need to transition over a larger voltage range to be immune from noise and would be sensitive to external loading. Also, the receiver for such a signal is generally not as accurate since it must sense an absolute voltage rather than compare two signals and react when one is greater or less than the other as in accordance with the present invention. The driver of the invention is thus preferably used with differential signals.

As noted above, quadrature clocking is preferably used in accordance with the invention for providing the synchronization signals to the cache controller chips 114 and 116. As noted above, two sets of differential signals are sent to the cache controllers 114 and 116 which are offset in time by approximately ¼ of the system clock period. This guarantees that the two sets of clocks are non-overlapping and thus useful to prevent race conditions. Moreover, since this delay is matched to the delay of the PC board traces, the user may control the timing of the clocks by adjusting the length of the PC board traces to give the best system performance. An example of how this may be best performed in accordance with the present invention will now be described with reference to FIG. 4.

Figure 4:
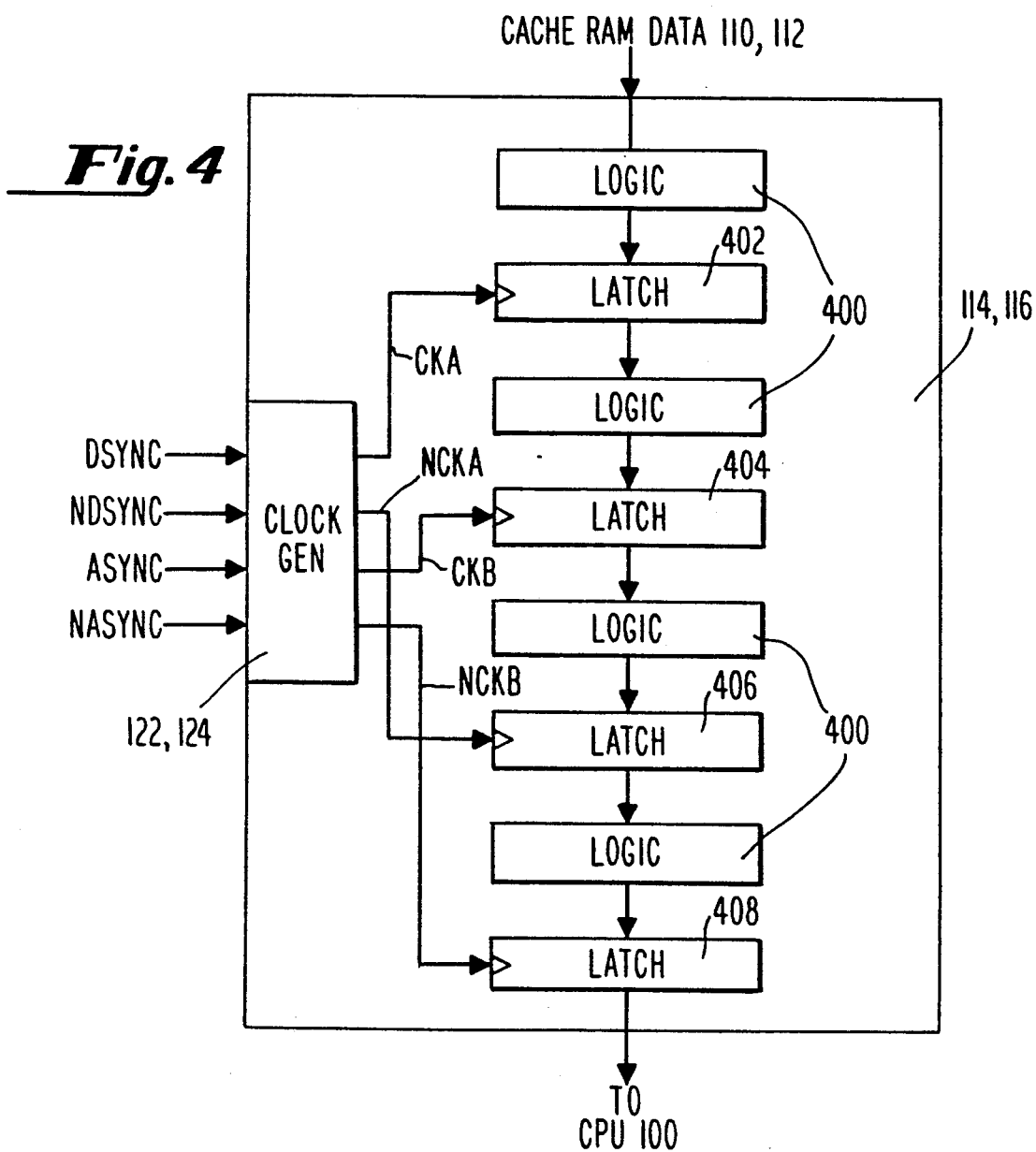
FIG. 4 illustrates an embodiment of the cache controller of FIG. 1 designed using pass-gate latch methodology which allows data to propagate through the cache controller circuitry with minimum delay by the clock edges.

FIG. 4 illustrates an embodiment of cache controllers 114 and 116 in which the cache controllers are designed using a pass-gate latch methodology which allows the data to propagate through the chip circuitry with minimum delay by the clock edges. As shown, the differential quadrature clocking signals DSYNC, NDSYNC, ASYNC and NASYNC are received by clock generator 122 (or 124) of cache controller 114 (or 116) for generating quadrature clocking signals CKA, NCKA, CKB and NCKB. In accordance with the passgate latch design methodology of the invention, the cache controller 114 (or 116) is formed as a pipeline propagation system in which the propagation delay of respective logic units 400 is approximately equal to the clock delay between the respective clocking signals output by clock generator 122 (or 124). In other words, the circuitry of the cache controller 114 (or 116) is broken into portions which have propagation delays on average equal to the time intervals between the respective quadrature clocking signals. Latching circuits 402–408 are then alternated between the respective logic circuits to pass the data along to the next stage. Latch circuits 402–408 preferably propagate data when the received clocking signal is high, i.e., they are not edge triggered. These latch circuits thus break up the cache controller 114 (or 116) into respective stages having propagation delays on average approximately equal to the clock delays between the respective quadrature clocking signals. These latching circuits thus gate the data for propagation through the cache controller 114 (or 116), but in theory, data can propagate through the chip logic and never be delayed by a clock edge by designing the logic stages 400 to have propagation delays on average approximately equal to the quadrature clocking signal delays as described.

Using such a technique in accordance with the invention, the highest possible clock rate should be attainable for a given technology. Moreover, by eliminating the reference clock generator skew from the system clock skew calculations, the clock skew in accordance with the invention may approximate the difference between max and min (max-min) of the circuit propagation delays so that at least a 50% clock skew improvement is possible. Also, by reducing the skew of the data latch clock relative to the clock used to drive addresses, shorter cycle times and hence better performance is possible. In addition, latch clock placement can be easily optimized for different speed cache RAMs since the tuning of the latch clock placement may be done by varying a PC board trace delay. Other advantages will become apparent to those skilled in the art.

Accordingly, those skilled in the art will readily appreciate that many modifications to the invention are possible within the scope of the invention. For example, the technique of the invention need not be limited to cache controllers but also may be used in conjunction with other system limiting paths of a data processing system. In addition, the delay of the PC board traces can be further tuned by modifying the lengths of the traces carrying signals CSYNC and NCSYNC rather than just the PC board trace 128 shown in FIG. 1. This delay can then be compensated for by appropriately adjusting the length of other PC board traces as necessary. Thus, the scope of the invention is not intended to be limited by the preferred embodiments described above, but only by the appended claims.

I claim:

1. A low skew clocking system for a plurality of integrated circuit chips on a common PC board, comprising:

a master system clock which generates a master clock signal for said integrated circuit chips;

a local reference clock circuit on one of said integrated circuit chips which is responsive to said master clock signal for generating a local reference clock signal for predetermined other ones of said plurality of integrated circuit chips; and means for driving said predetermined other ones of said plurality of integrated circuit chips with signals synchronized to said local reference clock signal, said driving means comprising a differential MOS driving circuit having low resistance MOSFETs which have commonly connected sources and are responsive at respective gates thereof to said local reference clock signal, a first resistance connected between a first voltage $V_H$ and said commonly connected sources of said low resistance MOSFETs, and second resistances connected between a second voltage $V_L$ and respective drains of said low resistance MOSFETs, the respective resistance values R1 and R2 of said first and second resistances being substantially greater than the internal ON impedances of said low resistance MOSFETs such that output voltages $V_{OUTH}$ and $V_{OUTL}$ of said differential MOS driving circuit are substantially equal to the ratio of R1 and R2 multiplied by the difference between $V_H$ and $V_L$.

2. A clocking system as in claim 1, wherein R2 is selected to substantially match the characteristic impedance of PC board traces connecting it to said respective low resistance MOSFETs.

3. A clocking system as in claim 1, wherein $V_{OUTH}$ is approximately equal to:

$$(V_H-V_L)*R2/(R1+R2)+V_L, \text{ where}$$
$$V_{OUTH}=V_L.$$

4. A clocking system as in claim 1, wherein said low resistance MOSFETs are at least 100 microns wide.

5. A clocking system as in claim 4, wherein said low resistance MOSFETs are approximately 500 microns wide.

6. A clocking system as in claim 1, further comprising means responsive to said signals from said driving means for generating differential quadrature clocking signals separated by a delay approximately equal to one-fourth of a clocking interval of said signals from said driving means.

7. A clocking system as in claim 6, wherein said delay is chosen to substantially correspond to a propagation delay of a PC board trace connecting respective integrated circuit chips on said PC board.

8. A clocking system as in claim 6, wherein at least one of said plurality of integrated circuit chips is comprised of alternating combinational logic and latch circuits responsive to said differential quadrature clocking signals.

9. A clocking system as in claim 8, wherein said alternating combinational logic and latch circuits are disposed in a pipelined configuration, whereby each respective latch circuit of said at least one integrated chip receives a differential quadrature clocking signal separated by said delay from the quadrature clocking signals received by adjacent latch circuits.

10. A clocking system as in claim 9, wherein an average propagation time of said combinational logic circuits is approximately equal to said delay.

11. A low skew clocking system for a plurality of integrated circuit chips on a common PC board, comprising:
    a master system clock which generates a master clock signal for said integrated circuit chips;
    a local reference clock circuit on one of said integrated circuit chips which is responsive to said master clock signal for generating a local reference clock signal for predetermined other ones of said plurality of integrated circuit chips;
    means for driving said predetermined other ones of said plurality of integrated circuit chips with signals synchronized to said local reference clock signal; and
    means responsive to said signals from said driving means for generating differential quadrature clocking signals separated by a delay approximately equal to one-fourth of a clocking interval of said signals from said driving means, said delay substantially corresponding to a propagation delay of a PC board trace connecting respective integrated circuit chips on said PC board.

12. A clocking system as in claim 11, wherein at least one of said plurality of integrated circuit chips is comprised of alternating combinational logic and latch circuits responsive to said differential quadrature clocking signals.

13. A clocking system as in claim 12, wherein said alternating combinational logic and latch circuits are disposed in a pipelined configuration, whereby each respective latch circuit of said at least one integrated chip receives a differential quadrature clocking signal separated by said delay from the quadrature clocking signals received by adjacent latch circuits.

14. A clocking system as in claim 13, wherein an average propagation time of said combinational logic circuits is approximately equal to said delay.

15. A method of low skew clocking a plurality of integrated circuit chips on a common PC board, comprising the steps of:
    generating at an integrated circuit chip of said common PC board a local reference clock signal from a master system clock;
    generating from said local reference clock signal differential quadrature clocking signals separated by a delay approximately equal to one-fourth of a clocking interval of said local reference clock signal, said delay substantially corresponding to a propagation delay of a PC board trace connecting respective integrated circuit chips on said PC board; and
    driving predetermined ones of said plurality of integrated circuit chips with said differential quadrature clocking signals.

16. A method as in claim 15, comprising the further step of adjusting the length of said PC board trace until its propagation delay is approximately equal to one-fourth of said clocking interval of said local reference clock signal.

17. A method as in claim 16, comprising the further steps of forming at least one of said plurality of integrated circuit chips of alternating combinational logic and latch circuits responsive to said differential quadrature clocking signals and disposing said alternating combinational logic and . latch circuits in a pipelined configuration such that each respective latch circuit of said at least one integrated chip receives a differential quadrature clocking signal separated by said delay from the differential quadrature clocking signals received by adjacent latch circuits.

18. A method as in claim 17, wherein said combinational logic circuits are formed so as to have propagation times which are on average approximately equal to said delay.

19. A method of low skew clocking a plurality of integrated circuit chips on a common PC board, comprising the steps of:
    forming at least one of said plurality of integrated circuit chips of alternating combinational logic and latch circuits in a pipelined configuration, said combinational logic circuits being formed so as to have propagation delays which are on average approximately equal to a predetermined delay;
    generating at an integrated circuit chip of said common PC board a local reference clock signal from a master system clock;
    generating from said local reference clock signal differential quadrature clocking signals separated by said predetermined delay, said predetermined delay being approximately equal to one-fourth of a clocking interval of said local reference clock signal; and
    applying said differential quadrature clocking signals to said latch circuits of said at least one integrated circuit chip such that each respective latch circuit receives a differential quadrature clocking signal separated by said predetermined delay from the differential quadrature clocking signals received by adjacent latch circuits.

20. A method as in claim 19, wherein said predetermined delay substantially corresponds to a propagation delay of a PC board trace connecting respective integrated circuit chips on said PC board.

21. A method as in claim 20, comprising the further step of adjusting the length of said PC board trace until its propagation delay substantially equals said predetermined delay.